United States Patent
Shen

(10) Patent No.: US 11,901,620 B2
(45) Date of Patent: Feb. 13, 2024

(54) COEXISTENCE THROUGH DIRECTIONAL COUPLER

(71) Applicant: Qorvo US, Inc., Greensboro, NC (US)

(72) Inventor: Yilong Shen, Nijmegen (NL)

(73) Assignee: Qorvo US, Inc., Greensboro, NC (US)

( * ) Notice: Subject to any disclaimer, the term of this patent is extended or adjusted under 35 U.S.C. 154(b) by 292 days.

(21) Appl. No.: 17/371,670

(22) Filed: Jul. 9, 2021

(65) Prior Publication Data

US 2022/0013897 A1    Jan. 13, 2022

Related U.S. Application Data

(60) Provisional application No. 63/050,426, filed on Jul. 10, 2020.

(51) Int. Cl.
*H01Q 1/50* (2006.01)
*H04B 1/44* (2006.01)
*H04B 1/18* (2006.01)
*H04B 1/04* (2006.01)

(52) U.S. Cl.
CPC ............. *H01Q 1/50* (2013.01); *H04B 1/0458* (2013.01); *H04B 1/18* (2013.01); *H04B 1/44* (2013.01)

(58) Field of Classification Search
CPC .......... H03H 7/40; H04B 1/0458; H04B 1/18; H04B 1/44; H01Q 1/50; H01Q 1/521
See application file for complete search history.

(56) References Cited

U.S. PATENT DOCUMENTS

| | | | | |
|---|---|---|---|---|
| 9,641,205 B1* | 5/2017 | Hyun | ...................... | H04B 1/525 |
| 10,581,155 B1* | 3/2020 | Gradinaru | .............. | H04B 1/109 |
| 10,938,369 B1* | 3/2021 | Gradinaru | ................ | H03H 7/18 |
| 11,121,693 B1* | 9/2021 | Labadie | .................... | H03H 7/40 |
| 2012/0195351 A1* | 8/2012 | Banwell | ................. | H04B 1/525 |
| | | | | 375/219 |
| 2018/0294540 A1* | 10/2018 | Cheng | .................... | H03H 7/487 |
| 2019/0207633 A1* | 7/2019 | Huusari | ................. | H04B 1/525 |
| 2020/0067606 A1* | 2/2020 | Raghavan | .............. | H04B 15/00 |
| 2020/0119440 A1* | 4/2020 | Paulsen | .................... | H03H 7/38 |
| 2020/0161755 A1 | 5/2020 | Olesen et al. | | |
| 2021/0218430 A1* | 7/2021 | Han | ......................... | H04B 1/18 |
| 2021/0344096 A1* | 11/2021 | Seki | ..................... | H04B 1/0458 |
| 2022/0029285 A1* | 1/2022 | Svendsen | ............... | H01Q 21/24 |

OTHER PUBLICATIONS

Charalampou et al. "Experimenting on LTE-U and WiFi coexistence" 2019 4th South-East Europe Design Automation, Computer Engineering, Computer Networks and Social Media Conference (SEEDA-CECNSM), 2019, 6 pages.

(Continued)

*Primary Examiner* — Seokjin Kim
(74) *Attorney, Agent, or Firm* — Withrow & Terranova, P.L.L.C.

(57) ABSTRACT

A directional coupler for co-located antennas contemplates coupling a first transceiver to an antenna through a directional coupler. A second transceiver is also coupled to the antenna using the directional coupler. When the first transceiver is transmitting, the second transceiver may receive through the antenna without suffering interference from signals transmitted by the first transceiver. To facilitate signal handling, a tunable or variable load may also be coupled to the directional coupler.

20 Claims, 9 Drawing Sheets

(56) References Cited

OTHER PUBLICATIONS

Chen et al. "A Decoupling Technique for Increasing the Port Isolation Between Two Strongly Coupled Antennas" IEEE Transactions on Antennas and Propagation, vol. 56, No. 12, Dec. 2008, pp. 3650-3658.

Da Ponte et al. "CASH: A Channel Assigner Algorithm for Heterogeneous Devices in Smart Homes" 2019 IFIP/IEEE Symposium on Integrated Network and Service Management (IM), 2019, pp. 624-628.

Hong et al. "Applications of Self-Interference Cancellation in 5G and Beyond" IEEE Communications Magazine, vol. 52, No. 2, 2014, pp. 114-121.

Jain et al. "Enabling In-Band Coexistence of Millimeter-Wave Communication and Radar" 2020 IEEE International Radar Conference (RADAR), 2020, pp. 772-777.

Jasteh, Donya "Isolation Enhancement in a Dual Port Antenna" Thesis, The University of Birmingham, Master of Philosophy (MPhil), Oct. 2011, 109 pages.

Kim et al. "A Passive Circulator for RFID Application with High Isolation using a Directional Coupler" Proceedings of the 36th European Microwave Conference, Sep. 2006, Manchester UK, pp. 196-199.

Kumu Networks "K4051 Canceller Reference Board" K4051 Canceller Product Brief, Apr. 2020, www.kumunetworks.com, 2 pages.

Neburka et al. "Study of the Coexistence between ZigBee and Wi-Fi IEEE 802.11b/g Networks in the ISM Band" 2015 25th International Conference Radioelektronika (Radioelektronika), 2015, 4 pages.

Polak et al. "LTE and LoRa in the 2.4 GHz Band: Adjacent Channel Interference Issues" 2020 30th International Conference Radioelektronika (Radioelektronika), 2020, 4 pages.

International Search Report and Written Opinion for International Patent Application No. PCT/US2022/018876, dated Jul. 5, 2022, 14 pages.

\* cited by examiner

COEXISTENCE THROUGH DIRECTIONAL COUPLER

RELATED APPLICATIONS

This application claims the benefit of provisional patent application Ser. No. 63/050,426, filed Jul. 10, 2020, the disclosure of which is incorporated herein by reference in its entirety.

FIELD OF THE DISCLOSURE

The technology of the disclosure relates generally to mitigating interference from co-located antennas in a device supporting multiple wireless technologies.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

Many mobile communication devices support multiple transceivers that may operate according to different wireless technologies. For example, it is not uncommon for a smart phone to include a Wi-Fi transceiver, a BLUETOOTH transceiver (including modern variants such as BLUETOOTH Low Energy (BLE)), a Zigbee transceiver, a cellular transceiver, and the like. While the presence of these multiple transceivers increases the versatility and functionality of the mobile communication device, the multiple transceivers create problems for one another.

Specifically, the antennas associated with these transceivers must necessarily be located proximate one another given the limited real estate of the mobile communication device. When the antennas are proximate one another, a signal being transmitted from one antenna may couple to a proximate antenna thereby interfering with signals being received by the proximate antenna, particularly for the auxiliary transceivers (e.g., BLUETOOTH(BLE), Zigbee, WIFI, etc.). This antenna coupling creates an opportunity for innovation to reduce interference generated by proximate or co-located antennas.

SUMMARY

Embodiments of the disclosure relate to providing coexistence through a directional coupler for co-located antennas. Specifically, exemplary aspects contemplate coupling a first transceiver to a first antenna through a directional coupler. A second transceiver is also coupled to the first antenna (i.e., sharing the first antenna) using the directional coupler while also being coupled to a second antenna. When the first transceiver is transmitting, the second transceiver may receive desired signals through the second antenna, albeit likely suffering from interference from transmitted signals from the first transceiver. However, the second transceiver may also receive the desired signals through the first antenna without suffering interference from signals transmitted by the first transceiver. To facilitate signal handling, a load (not limited to matched load) may be coupled to the directional coupler to assist with interference cancellation. In some aspects, this load may be variable or tunable to facilitate operation in changing electromagnetic environments (e.g., a mobile communication device held by a user). By receiving through the first antenna which is also shared by the interfering first transceiver, the second transceiver receives a reduced or eliminated amount of interference received at the second transceiver from the first transceiver improving signal-to-noise ratio, improving signal processing efficiency, and the user experience.

In one aspect, a device is disclosed. The device comprises a first transceiver. The device also comprises a first directional coupler coupled to the first transceiver. The device also comprises a first antenna coupled to the first directional coupler. The device also comprises a second antenna. The device also comprises a second transceiver coupled to the first directional coupler and the second antenna. The second transceiver comprises a control circuit. The control circuit is configured to select between the second antenna and the first antenna.

In another aspect, a device is disclosed. The device comprises a first transceiver. The device also comprises a second transceiver. The device also comprises a variable load. The device also comprises a directional coupler comprising four ports. A first port of the four ports is configured to be coupled to an antenna. A second port of the four ports is coupled to the first transceiver. A third port of the four ports is coupled to the second transceiver. A fourth port of the four ports is coupled to the variable load.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 5A:
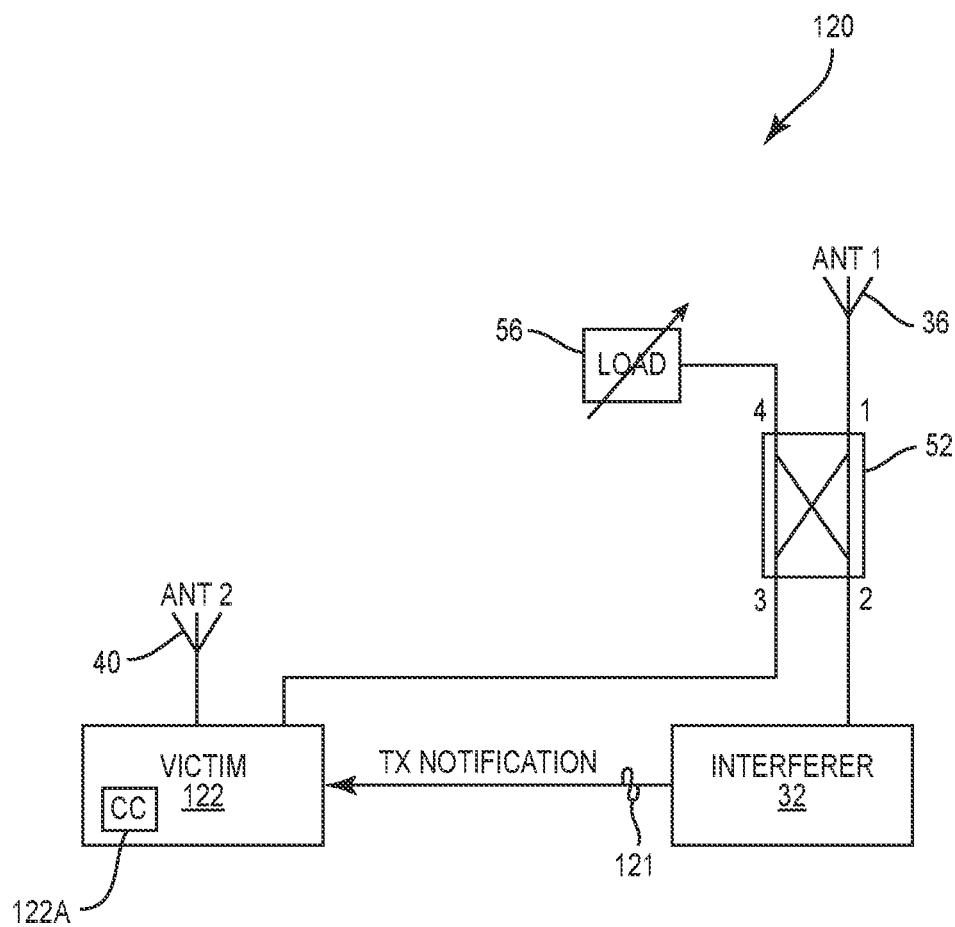
Figure 5B:
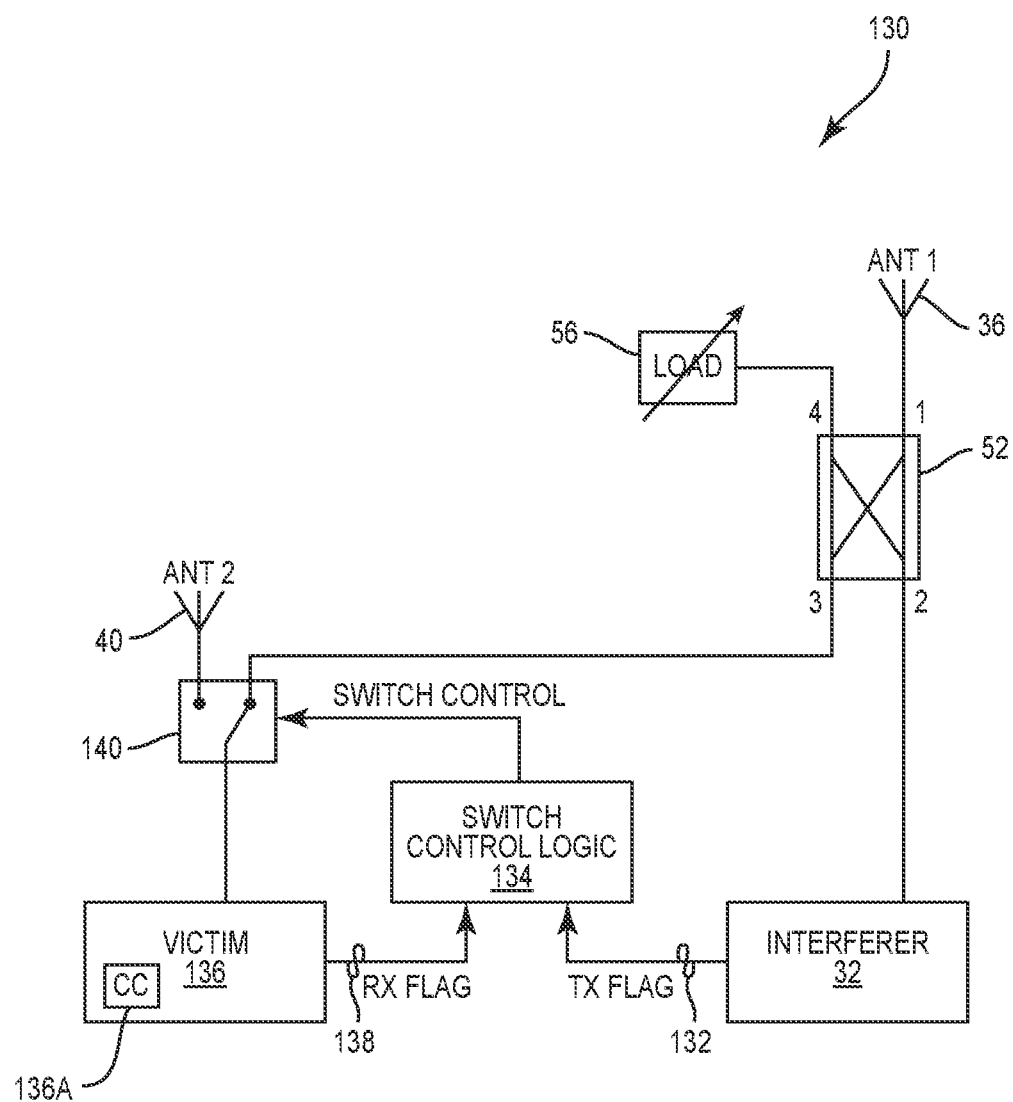
Figure 5C:
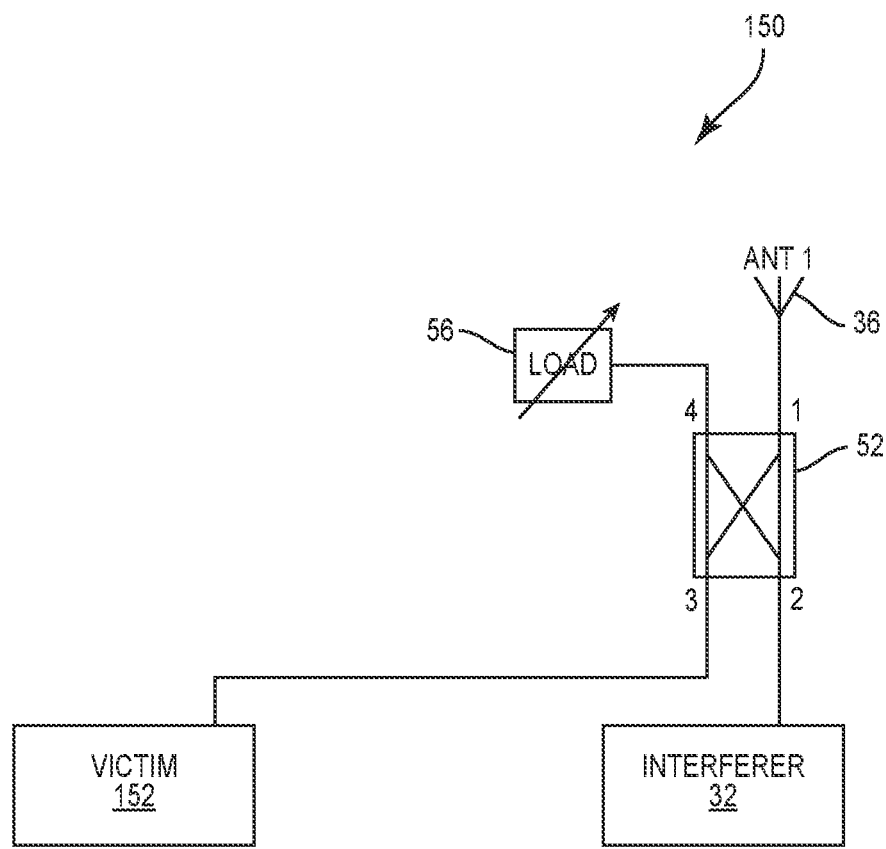
Figure 6:
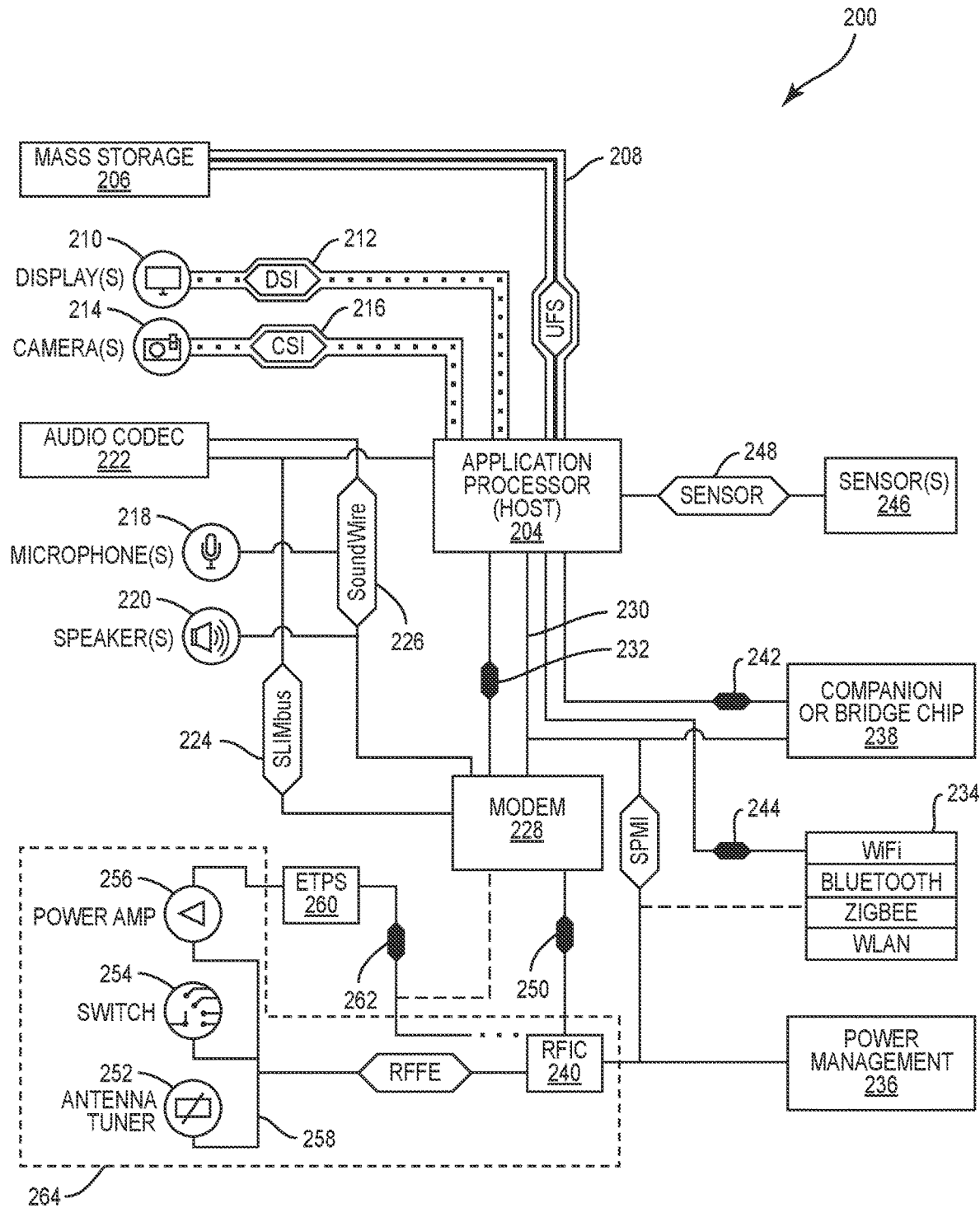

FIGS. 5A-5C provide block diagrams of alternate aspects of the present disclosure; and FIG. 6 is a block diagram of a wireless communication device that includes multiple transceivers and may benefit from the present disclosure.

DETAILED DESCRIPTION

The embodiments set forth below represent the necessary information to enable those skilled in the art to practice the embodiments and illustrate the best mode of practicing the embodiments. Upon reading the following description together with the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure relate to providing coexistence through a directional coupler for co-located antennas. Specifically, exemplary aspects contemplate coupling a first transceiver to a first antenna through a directional coupler. A second transceiver is also coupled to the first antenna (i.e., sharing the first antenna) using the directional coupler while also being coupled to a second antenna. When the first transceiver is transmitting, the second transceiver may receive desired signals through the second antenna, albeit likely suffering from interference from transmitted signals from the first transceiver. However, the second transceiver may also receive the desired signals through the first antenna without suffering interference from signals transmitted by the first transceiver. To facilitate signal handling, a load (not limited to matched load) may be coupled to the directional coupler to assist with interference cancellation. In some aspects, this load may be variable or tunable to facilitate operation in changing electromagnetic environments (e.g., a mobile communication device held by a user). By receiving through the first antenna which is also shared by the interfering first transceiver, the second transceiver receives a reduced or eliminated amount of interference received at the second transceiver from the first transceiver improving signal-to-noise ratio, improving signal processing efficiency, and the user experience.

Figure 1:
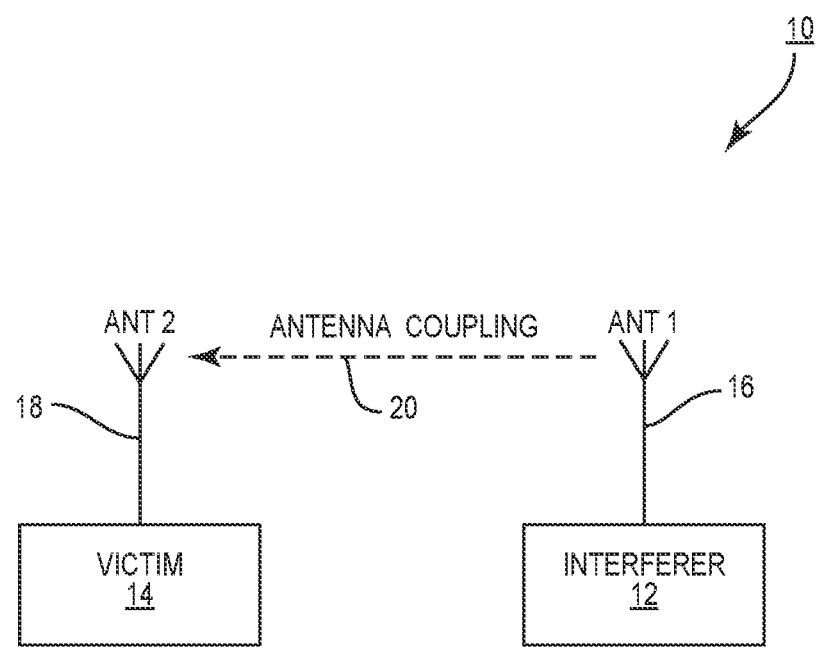
FIG. 1 is a block diagram illustrating two transceivers experiencing interference therebetween.

Before addressing particular aspects of the present disclosure, a brief discussion of the context is provided. Specifically, FIG. 1 illustrates how proximate transceivers may interfere with one another through antenna coupling. A discussion of solutions to this problem begins below with reference to FIG. 2 where a directional coupler is used to connect two transceivers.

In this regard, FIG. 1 is a block diagram of a device 10 that may be a mobile communication device having a first transceiver 12 and a second transceiver 14. By way of example, the first transceiver 12 may be a WiFi transceiver and the second transceiver 14 may be a BLUETOOTH transceiver. In some situations, transceiver 12 can be only a transmitter for one radio and/or second transceiver 14 can be only a receiver for another radio. The first transceiver 12 may be coupled to a first antenna 16. Similarly, the second transceiver 14 may be coupled to a second antenna 18. Transmissions from the first transceiver 12 through the first antenna 16 may radiate outward from the first antenna 16 and impinge on the second antenna 18 as illustrated by antenna coupling 20. As a function of this coupling, the first transceiver 12 may interfere with reception at the second transceiver 14, and accordingly may be referred to as Interferer and Victim, respectively.

For the sake of further illustration, the first transceiver 12 may be transmitting power $P_i$. The second transceiver 14 sees an interference of power $P_i + C_{Ant}$ ($C_{Ant}$ is the antenna coupling coefficient between the antennas 16 and 18 in decibel and is a negative number), besides the desired signal power $P_v$. Given all the values in decibel units, the signal-to-interference (S2I) at the second transceiver 14 is $S2I_{State\_of\_the\_art}$ as set forth in (EQ. 1).

$$S2I_{State-of-the-art} = P_v - (P_i + C_{Ant}) \quad (EQ.\ 1)$$

The received power at the second transceiver 14, $P_{State-of-the-art}$, consists of the intended signal power $P_v$ and interference $P_i + C_{Ant}$ as given in (EQ. 2)

$$P_{State-of-the-art} = P_v \& P_i + C_{Ant} \quad (EQ.\ 2)$$

While the discussion of exemplary aspects of the present disclosure focuses on a mobile communication device context, it should be appreciated that the present disclosure is not so limited. For example, a gateway or set-top box that has multiple transceivers may also benefit from the present disclosure.

Exemplary aspects of the present disclosure reduce and potentially eliminate the interference at the second transceiver by adding a directional coupler to the first antenna that also acts to couple the second transceiver to the first antenna. This arrangement allows the second transceiver to receive signals through the first antenna while the first transceiver is transmitting through the first antenna. The directional coupler isolates the transmitted signal away from the second transceiver while still allowing the second transceiver to receive the intended signal. By reducing a magnitude of the interference from the first transceiver that is seen by the second transceiver, the second transceiver may enjoy a better signal quality than would be obtainable in the device 10 of FIG. 1.

Figure 2:
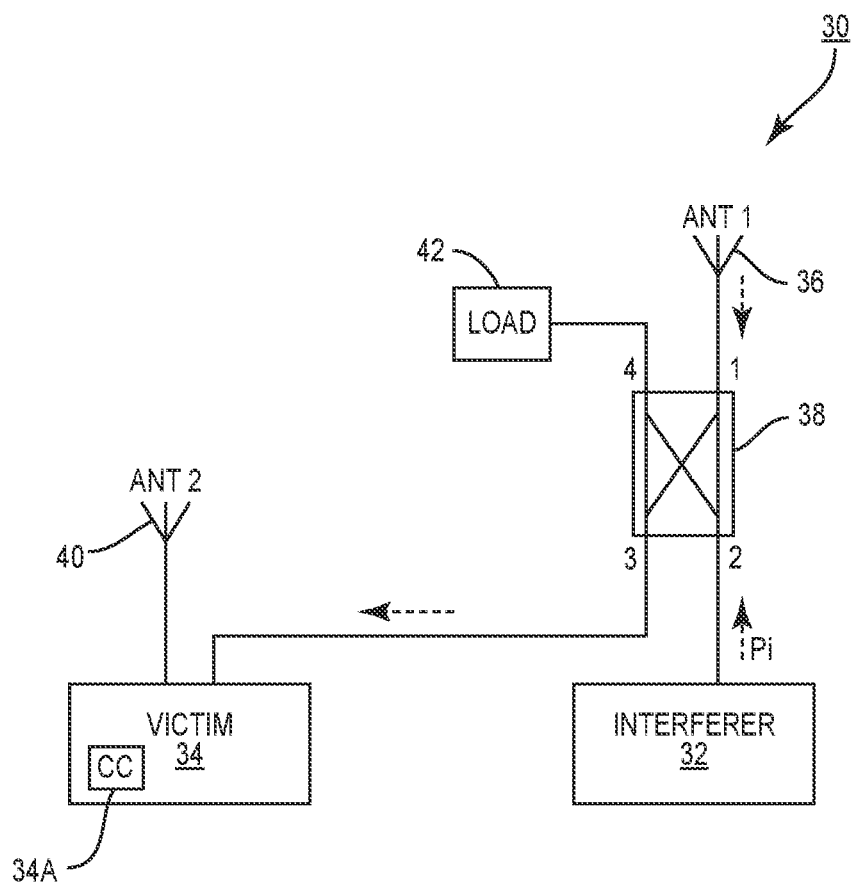
FIG. 2 is a block diagram of two transceivers using a directional coupler to mitigate interference according to an ideal aspect of the present disclosure.

More specifically, FIG. 2 illustrates a device 30 having a first transceiver 32 (the interferer) and a second transceiver 34 (the victim). In some situations, transceiver 32 can be only a transmitter for one radio and/or transceiver 34 can be only a receiver for another radio. The first transceiver 32 is coupled to a first antenna 36 through a directional coupler 38. The second transceiver 34 is also coupled to the directional coupler 38 and a second antenna 40. The directional coupler 38 is assumed, for this discussion, to be ideal, meaning that there is no direct leakage between port 2 and port 3. The directional coupler 38 is further coupled to a matched load 42.

With continued reference to FIG. 2, the second transceiver 34 may include a control circuit 34A with associated software that determines whether the second transceiver 34 receives and processes signals from the second antenna 40 or from the first antenna 36 through the directional coupler 38. For example, if the first transceiver 32 is not transmitting, then the signal coming through the second antenna 40 may be a better signal and the second transceiver 34 uses the signal coming through second antenna 40. However, if the first transceiver 32 is transmitting, then the signal coming through the second antenna 40 may be degraded by interference radiating from the first antenna 36. In such a situation, the signal coming through the first antenna 36 through the directional coupler 38 may be better than the signal coming through the second antenna 40. Accordingly, in this latter situation, the software may select the signal coming through the first antenna 36. Alternatively, the control circuit 34A may use maximal ratio combining or other diversity technique to receive the signal.

In the interests of better explanation, the mathematics behind the device 30 are provided and contrasted with EQ. 1 and EQ. 2 of the device 10 of FIG. 1. In either device 10 or device 30, let $P_i$ be the transmitted power that comes from the first transceiver 32. In device 30, $P_i$ goes into port 2 (P2) of the directional coupler 38. There is likely a reflection from the first antenna 36, so when the first transceiver 32 is transmitting, the power inputting into port 1 (P1) of the directional coupler 38 from first antenna 36 is $P_v$ & $(P_i+T_c+\Gamma_{Ant})$. $P_v$ is the power of the desired signal destined for the second transceiver 34. $T_c$ and $\Gamma_{Ant}$ are the transmission coefficients of the directional coupler 38 from its port 2 to port 1 and the reflection coefficient of the first antenna 36, respectively. As before, all these values are in decibel units. When the first transceiver 32 is transmitting, the second transceiver 34 sees a total input power from port 3 (P3) of the directional coupler 38 $P_{Coupler}$ given by EQ. 3, $$P_{Coupler}=P_v+C_c\&P_i+T_c+\Gamma_{Ant}+C_c \quad (EQ.\ 3)$$

with $C_c$ being the coupling coefficient of the directional coupler 38 from its port 1 to port 3. The second transceiver 34 sees a total input power of $P_v$ & $P_i+T_c+C_{Ant}$, from the second antenna 40, so the S2I for the second antenna, denoted by $S2I_{Ant2}$, is $$S2I_{Ant2}=P_v-(P_i+T_c+C_{Ant}). \quad (EQ.\ 4)$$

The S2I of $P_{Coupler}$ of EQ. 3, denoted by $S2I_{Coupler}$, is $$S2I_{Coupler}=P_v-(P_i+T_c+\Gamma_{Ant}). \quad (EQ.\ 5)$$

The S2I difference then is $$S2I_{Coupler}-S2I_{Ant2}=C_{Ant}-\Gamma_{Ant}. \quad (EQ.\ 6)$$

Both $C_{Ant}$ and $\Gamma_{Ant}$ are negative in decibel (dB) units. It will generally be true that $C_{Ant}$ is relatively large and difficult to change, while $\Gamma_{Ant}$ is comparatively easier to control. EQ. 6 indicates that inserting a directional coupler 38 as shown in FIG. 2 causes the second transceiver 34 to see better S2I (5 dB to 15 dB expected) at its coupler port, when the first transceiver 32 is transmitting, assuming $\Gamma_{Ant}$ is adjusted smaller than $C_{Ant}$. Because of this, when the first transceiver 32 is transmitting, the second transceiver 34 turns to the coupler radio port, receives a signal from that port and has the S2I as $S2I_{Coupler}$ (EQ. 5). When the first transceiver 32 is not transmitting, the second antenna 40 usually has better S2I and is usually chosen as the receiving port. When the second transceiver 34 transmits, the second antenna 40 is always chosen to avoid loss of $C_c$ transmitting through the directional coupler 38.

The difference between $S2I_{Coupler}$ and $S2I_{State-of-the-art}$ is $$S2I_{Coupler}-S2I_{State-of-the-art}=C_{Ant}-\Gamma_{Ant}-T_c. \quad (EQ.\ 7)$$

EQ. 7 is re-expressed as EQ. 8 because $T_c$ is negative, small in magnitude, and disappears if $P_i$ in FIG. 2 is defined in a different but equally reasonable way.

$$S2I_{Coupler}-S2I_{State-of-the-art}=C_{Ant}-\Gamma_{Ant} \quad (EQ.\ 8)$$

For the same reason just explained, EQ. 8 means that the present disclosure has a S2I gain by an amount $C_{Ant}-\Gamma_{Ant}$. Additionally, $$P_{Coupler}-P_{State-of-the-art}=C_c\&\Gamma_{Ant}+C_c-C_{Ant}. \quad (EQ.\ 9)$$

EQ. 9 shows that compared to the state-of-the-art situation, the desired signal suffers a loss of $C_c$ ($C_c$ is negative), while the interference from the first transceiver 32 is attenuated additionally by $\Gamma_{Ant}-C_{Ant}$. This explains the gain of the S2I of EQ. 8. The loss $C_c$ of the desired signal is a limitation. The attenuation of the interfering signal, on the other hand, not only is beneficial for better S2I but also helps the receiver from being driven saturated, saturation being the other major form of the coexistence issue.

While it would be nice to assume that the directional coupler 38 is ideal, with no direct leakage from port 2 to port 3, the real world is not so forgiving. Accordingly, some correction may be provided to compensate for the direct leakage, as well as the interference reflected from antenna 36 and coupled from directional coupler port 1 to port 3. Exemplary solutions are provided in FIGS. 3A and 3B where a phase shifter or a variable load is used for better interference cancellation.

Figure 3A:
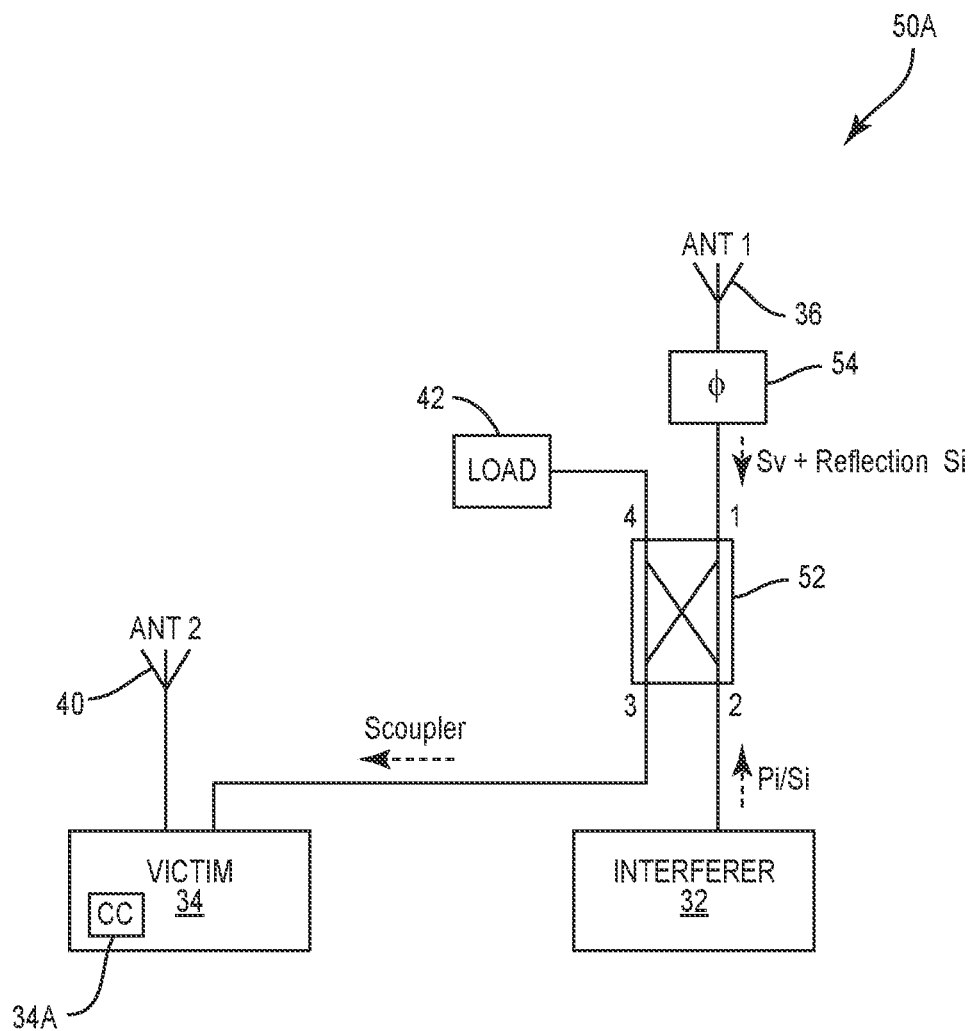
FIG. 3A is a block diagram of two transceivers using a directional coupler and a phase shifter to mitigate interference according to one non-ideal aspect of the present disclosure.

In this regard, FIG. 3A illustrates a device 50A that is substantially similar to the device 30 of FIG. 2 with many of the same elements. Specifically, the device 50A includes the first transceiver 32 (the interferer) and the second transceiver 34 (the victim). The first transceiver 32 is coupled to the first antenna 36 through a directional coupler 52, which differs from the directional coupler 38 in that the directional coupler 52 is not ideal and does have some amount of direct leakage from port 2 to port 3. The second transceiver 34 is also coupled to the directional coupler 52 and the second antenna 40. The directional coupler 52 is further coupled to a matched load 42. Additionally, a phase shifter 54 is positioned between the directional coupler 52 and the first antenna 36. Operation of the device 50A is substantially the same as operation of the device 30, but the non-ideal directional coupler 52 and the phase shifter 54 affect the mathematics as explained below. Here the math is presented with reference to the signals instead of the power.

For clarity, the interfering signal into P2 of the directional coupler 52 is denoted as $S_i$, the desired signal of the second transceiver 34 that comes into P1 is denoted as $S_v$, the reflection coefficient of the first antenna 36 is denoted as $S_{11\_Ant1}$, and the S parameter of the directional coupler 52 as $S_{xy}$, where x, y=1, 2, 3, or 4. For the sake of this explanation, these values are in absolute units instead of decibel units. Accordingly, the second transceiver 34 sees a signal $S_{Coupler}$ from the directional coupler port 3 as $$S_{Coupler}=S_v*S_{31} \& S_i*(S_{32}+S_{21}*S_{11\_Ant1}*S_{31}*\exp(j2\phi)). \quad (EQ.\ 10)$$

EQ. 10 shows that the interfering signal is $S_i*(S_{32}+S_{21}*S_{11\_Ant1}*S_{31}*\exp(j2\phi))$. If the magnitudes of $S_{32}$ and $S_{21}*S_{11\_Ant1}*S_{31}$ are similar (which is possible by controlling $S_{11\_Ant1}$ for example), by tuning the value of $\phi$, the magnitude of $S_{32}+S_{21}*S_{11\_Ant1}*S_{31}*\exp(j2\phi))$ can be effectively reduced. This reduction is the reason why even with the non-ideal directional coupler 52, S2I gain is not only still possible, but also can be even better than when the directional coupler is ideal. It should be appreciated that the non-ideal directional coupler 52 can possibly achieve better S2I than an ideal directional coupler, if the phase $\phi$ is close to the optimal value.

Figure 3B:
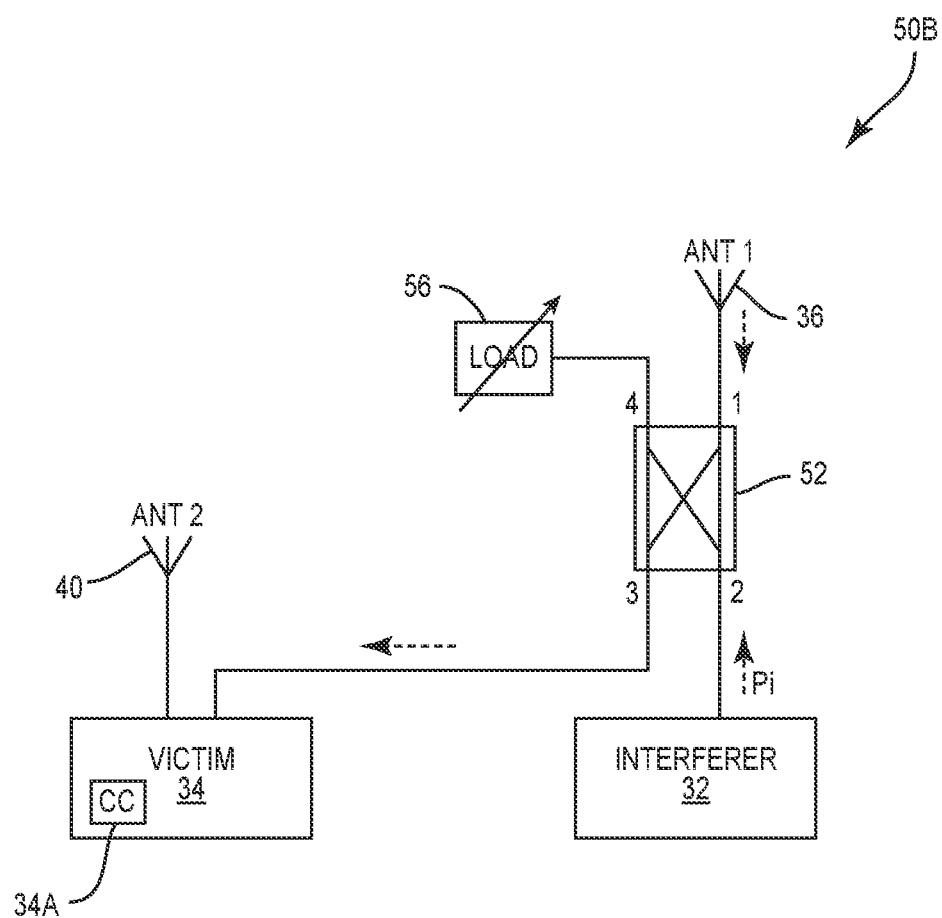
FIG. 3B is a block diagram of two transceivers using a directional coupler and a tunable load to mitigate interference according to a non-ideal aspect of the present disclosure.

While using a phase shifter 54 is one solution, another solution is shown by device 50B illustrated in FIG. 3B. The device 50B is similar to device 30 or device 50A and includes the first transceiver 32 (the interferer) and the second transceiver 34 (the victim). The first transceiver 32 is coupled to the first antenna 36 through the non-ideal directional coupler 52. The second transceiver 34 is also coupled to the directional coupler 52 and the second antenna 40. Additionally, instead of a matched load 42, a variable load 56 is coupled to port 4 of the directional coupler 52. Operation of the device 50B is substantially the same as operation of the device 30 or device 50A, but the variable load 56 is tuned to an optimum value to cancel the combined interference from the reflection at the first antenna 36 and the leakage directly from port 2 to port 3. The math of this aspect is omitted but is similar.

As an aside, the presence of the directional coupler 52 does have an impact in terms of the attenuation of signals by $C_c$, which likely ends up in the range of 10 dB to 15 dB subject to the designer's choice. Likewise, the directional coupler 52 imposes an insertion loss for the first transceiver 32. However, this loss is considered acceptable. For example, a 12 dB directional coupler 52 introduces a theoretical insertion loss of less than 0.3 dB, while a 10 dB directional coupler has a theoretical insertion loss of less than 0.5 dB. It should be appreciated that this sort of loss (attenuation by $C_c$ or insertion loss) is comparable to those found in many other conventional coexistence systems and is not deemed to be a net negative for the present disclosure.

In contrast, the present disclosure also provides an advantage in that the S2I gain of the second transceiver 34 is not based on any essential suffering of the first transceiver 32. Many conventional approaches, such as time division, require that the more gain in S2I for the Victim, the more traffic of the Interferer must be dropped.

Besides S2I gain, aspects of the present disclosure bring about antenna diversity gain for the Victim. That is, by virtue of coupling to the first antenna 36 as well as the second antenna 40, the second transceiver 34 has two antennas. Although the desired signal on the shared antenna is attenuated by $C_c$, the value of this attenuation is smaller than the signal fading fluctuation in, for example, Rayleigh channel. Therefore, the second transceiver 34 still enjoys a certain antenna diversity gain, albeit a reduced one.

Figure 4:
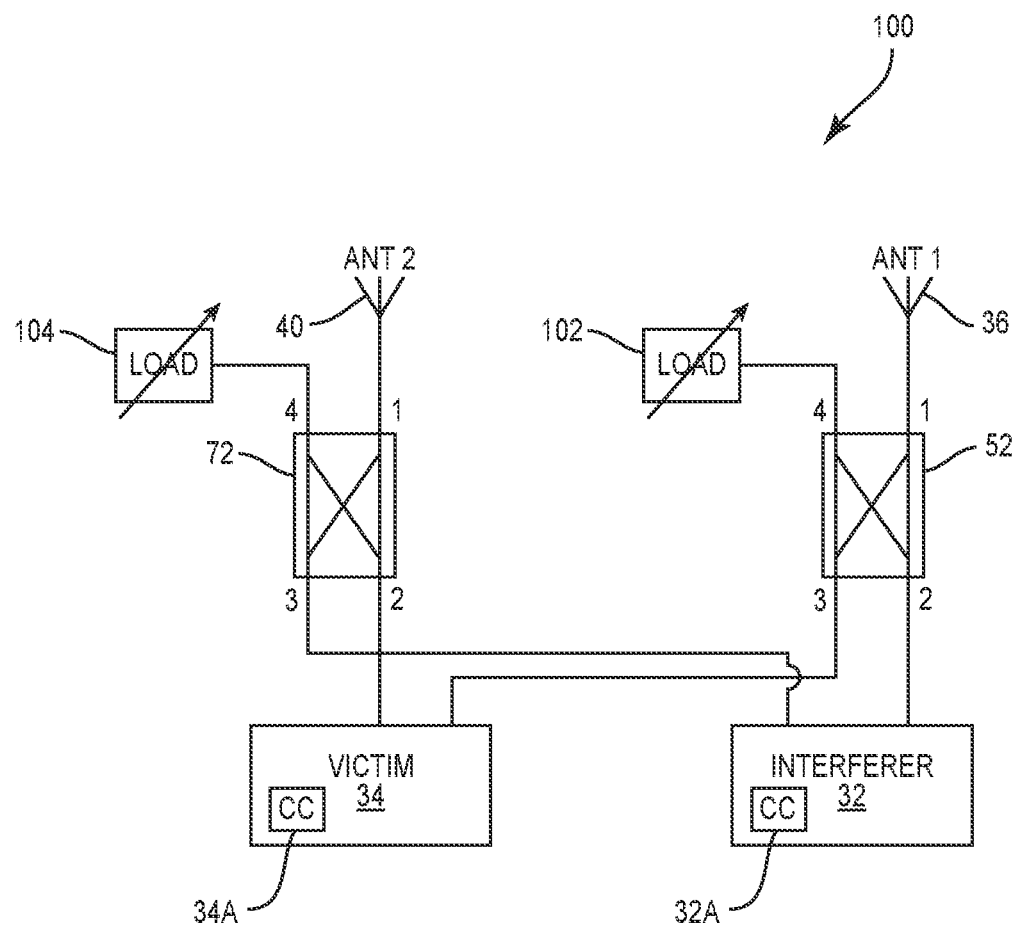
FIG. 4 is a block diagram of two transceivers using two directional couplers to enable bi-directional cancelation.

Mutual interference cancellation can also be achieved and is illustrated in FIG. 4 where a device 100 is similar to device 30, device 50A, or device 50B and includes the first transceiver 32 (the interferer) and the second transceiver 34 (the victim). The first transceiver 32 is coupled to the first antenna 36 through the non-ideal directional coupler 52. The second transceiver 34 is also coupled to the directional coupler 52. The first transceiver 32 is also coupled to a second directional coupler 72. The second transceiver 34 is coupled to the second antenna 40 through the second directional coupler 72. The directional coupler 52 is further coupled to a variable load 102, while the second directional coupler 72 is coupled to a second variable load 104. Operation of the device 100 is substantially the same as operation of the device 50B, where the control circuit 34A switches between antennas 36, 40 as needed. Similarly, a control circuit 32A switches between antennas 36, 40 as needed for the first transceiver 32.

While the above discussion focuses on the concept that the second transceiver may detect the interference and select to receive through the directional coupler, the present disclosure is not so limited. For example, the first transceiver could send a signal alerting the second transceiver as to the transmission state of the first transceiver. Such a device 120 is illustrated in FIG. 5A, where the first transceiver 32 sends a signal 121 to a second transceiver 122 that indicates that the first transceiver 32 is transmitting through the first antenna 36. A control circuit 122A may determine, based on the signal 121 to select the antenna port associated with the first antenna 36.

Another possibility is illustrated in FIG. 5B, where a first transceiver 32 in a device 130 sends a transmit flag signal 132 to a switch control circuit 134. A second transceiver 136 with a control circuit 136A may send a receive flag signal 138 to the switch control circuit 134. The switch control circuit 134 may control a switch 140 that switches between the second antenna 40 and the directional coupler 52. This arrangement may be appropriate when the second transceiver 136 only has one antenna port, but would still benefit from the present disclosure. Such situations may occur, for example, in BLE transceivers. Alternatively, the control circuit 136A may control the switch 140 and switch control circuit 134 may be eliminated (signal 132 goes all the way to the second transceiver 136 similar to FIG. 5A).

As still a further aspect, as shown in FIG. 5C, the device 150 may not have a second antenna for the second transceiver 152. As illustrated, the second transceiver 152 couples only to the directional coupler 52. Such situation is suboptimal because the second transceiver 152 suffers the loss of the directional coupler 52 for transmitted signals as well, but may be required for situations where space is limited and there is only room for one antenna 36. Likewise, this arrangement may be appropriate where the second transceiver 152 is largely dormant and has little or no transmissions.

It should be appreciated that the transceivers and directional couplers may be integrated into a single integrated circuit (IC) or may be in a device that is on a printed circuit board (PCB) or the like.

As noted above, the present disclosure is suitable for use in a mobile communication device or set top box. By way of illustration, FIG. 6 illustrates the use case of a mobile communication device or mobile terminal 200. In this regard, FIG. 6 is a system-level block diagram of an exemplary mobile terminal 200 such as a smart phone, mobile computing device tablet, or the like. The mobile terminal 200 includes an application processor 204 (sometimes referred to as a host) that communicates with a mass storage element 206 through a universal flash storage (UFS) bus 208. The application processor 204 may further be connected to a display 210 through a display serial interface (DSI) bus 212 and a camera 214 through a camera serial interface (CSI) bus 216. Various audio elements such as a microphone 218, a speaker 220, and an audio codec 222 may be coupled to the application processor 204 through a serial low-power interchip multimedia bus (SLIMbus) 224. Additionally, the audio elements may communicate with each other through a SOUNDWIRE bus 226. A modem 228 may also be coupled to the SLIMbus 224 and/or the SOUND-WIRE bus 226. The modem 228 may further be connected to the application processor 204 through a peripheral component interconnect (PCI) or PCI express (PCIe) bus 230 and/or a system power management interface (SPMI) bus 232.

With continued reference to FIG. 6, the SPMI bus 232 may also be coupled to one or more short range wireless transceivers (e.g., first transceiver 32 and second transceiver 34) such as a WIFI, BLUETOOTH, ZIGBEE, or other local area network (LAN or WLAN) IC(s) (LAN IC or WLAN IC) 234, a power management integrated circuit (PMIC) 236, a companion IC (sometimes referred to as a bridge chip) 238, and a radio frequency IC (RFIC) 240. It should be appreciated that separate PCI buses 242 and 244 may also couple the application processor 204 to the companion IC 238 and the WLAN IC(s) 234. The application processor 204 may further be connected to sensors 246 through a sensor bus 248. The modem 228 and the RFIC 240 may communicate using a bus 250.

With continued reference to FIG. 6, the RFIC 240 may couple to one or more RFFE elements, such as an antenna tuner 252, a switch 254, and a power amplifier 256 through a radio frequency front end (RFFE) bus 258. Additionally, the RFIC 240 may couple to an envelope tracking power supply (ETPS) 260 through a bus 262, and the ETPS 260 may communicate with the power amplifier 256. Collectively, the RFFE elements, including the RFIC 240, may be considered an RFFE system 264. It should be appreciated that the RFFE bus 258 may be formed from a clock line and a data line (not illustrated).

Those skilled in the art will recognize improvements and modifications to the preferred embodiments of the present disclosure. All such improvements and modifications are considered within the scope of the concepts disclosed herein and the claims that follow.

What is claimed is:

1. A device comprising:
a first transceiver;
a first directional coupler coupled to the first transceiver;
a first antenna coupled to the first directional coupler;
a second antenna; and
a second transceiver coupled to the first directional coupler and the second antenna, the second transceiver comprising a control circuit, the control circuit configured to select between the second antenna and the first antenna, wherein when the first antenna is selected, no signal from the second antenna is used by the second transceiver.

2. The device of claim 1, wherein the first transceiver comprises a wireless fidelity (WIFI) transceiver.

3. The device of claim 1, wherein the second transceiver comprises at least one of a BLUETOOTH or Zigbee transceiver.

4. The device of claim 1, wherein the first transceiver couples to port two (2) of the first directional coupler and the second transceiver couples to port three (3) of the first directional coupler.

5. The device of claim 4, wherein port two is isolated from port three.

6. The device of claim 1, further comprising a variable load coupled to the first directional coupler.

7. The device of claim 6, wherein the variable load is configured to be adaptively tuned responsive to changes in environment.

8. The device of claim 6, wherein the variable load is configured to be tuned at manufacture and subsequently remain static.

9. The device of claim 1, further comprising a phase shifter positioned between the first antenna and the first directional coupler.

10. The device of claim 1, further comprising a second directional coupler positioned between the second transceiver and the second antenna.

11. The device of claim 10, wherein the first transceiver is further coupled to the second directional coupler.

12. The device of claim 10, further comprising a second variable load coupled to the second directional coupler.

13. A device comprising:
a first transceiver;
a second transceiver;
a variable load; and
a directional coupler comprising four ports,
wherein a first port of the four ports is configured to be coupled to an antenna;
wherein a second port of the four ports is coupled to the first transceiver;
wherein a third port of the four ports is coupled to the second transceiver without passing through a second coupler; and
wherein a fourth port of the four ports is coupled to the variable load.

14. The device of claim 13, wherein the second transceiver comprises a control circuit configured to select between receiving a signal from the directional coupler or a second antenna.

15. The device of claim 13, wherein the device comprises a mobile communication device.

16. The device of claim 13, wherein the device comprises a set top box.

17. The device of claim 13, further comprising a second directional coupler coupled to the first transceiver and the second transceiver.

18. The device of claim 13, wherein the device comprises a printed circuit board (PCB).

19. The device of claim 13, wherein the first transceiver is configured to send a transmit notification signal to the second transceiver prior to the first transceiver transmitting a potentially interfering signal.

20. The device of claim 13, further comprising:
a switch control circuit coupled to the first transceiver and the second transceiver; and
a switch coupled to the switch control circuit and coupled to the directional coupler and configured to be coupled to a second antenna wherein the switch control circuit is configured to control the switch.

* * * * *